Figure 9:
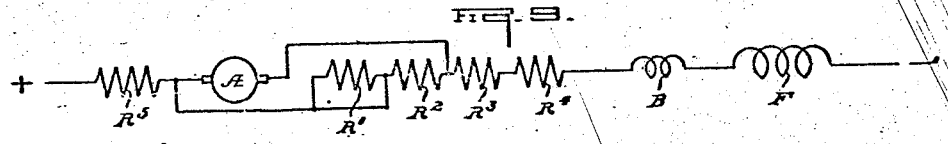
Figure 10:
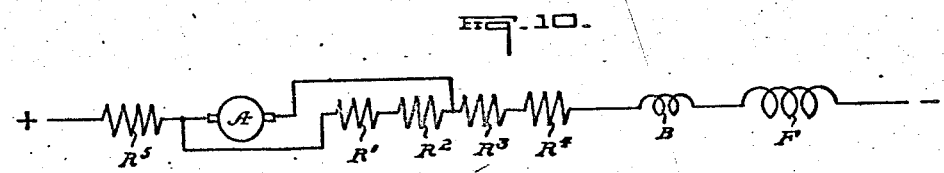
Figure 11:
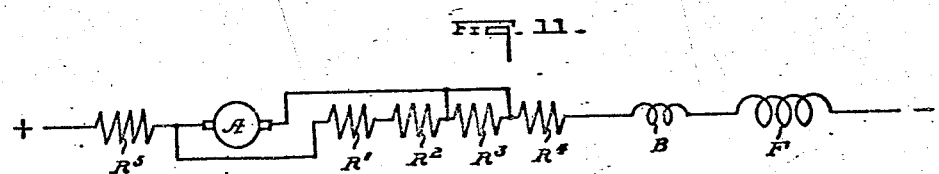

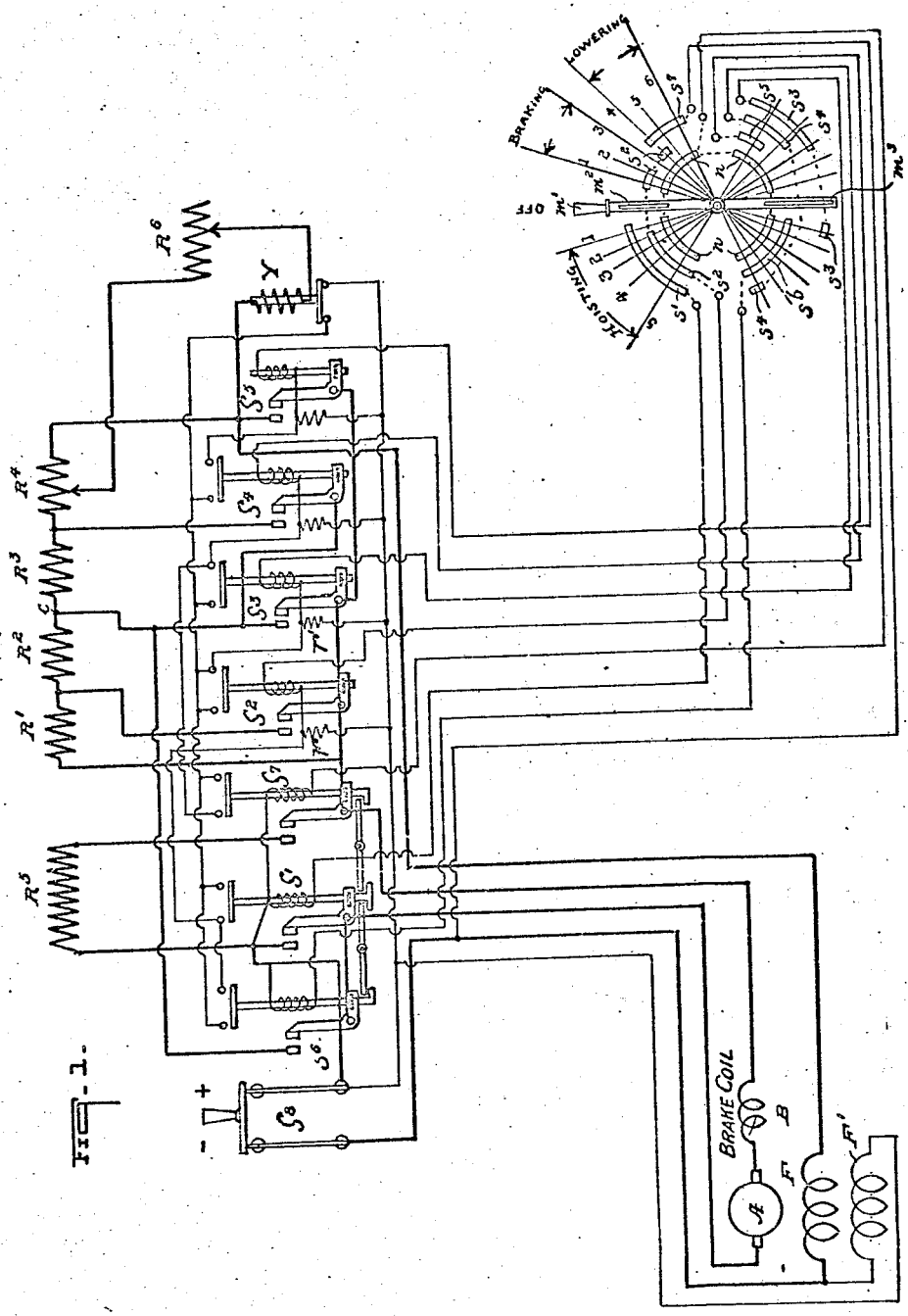

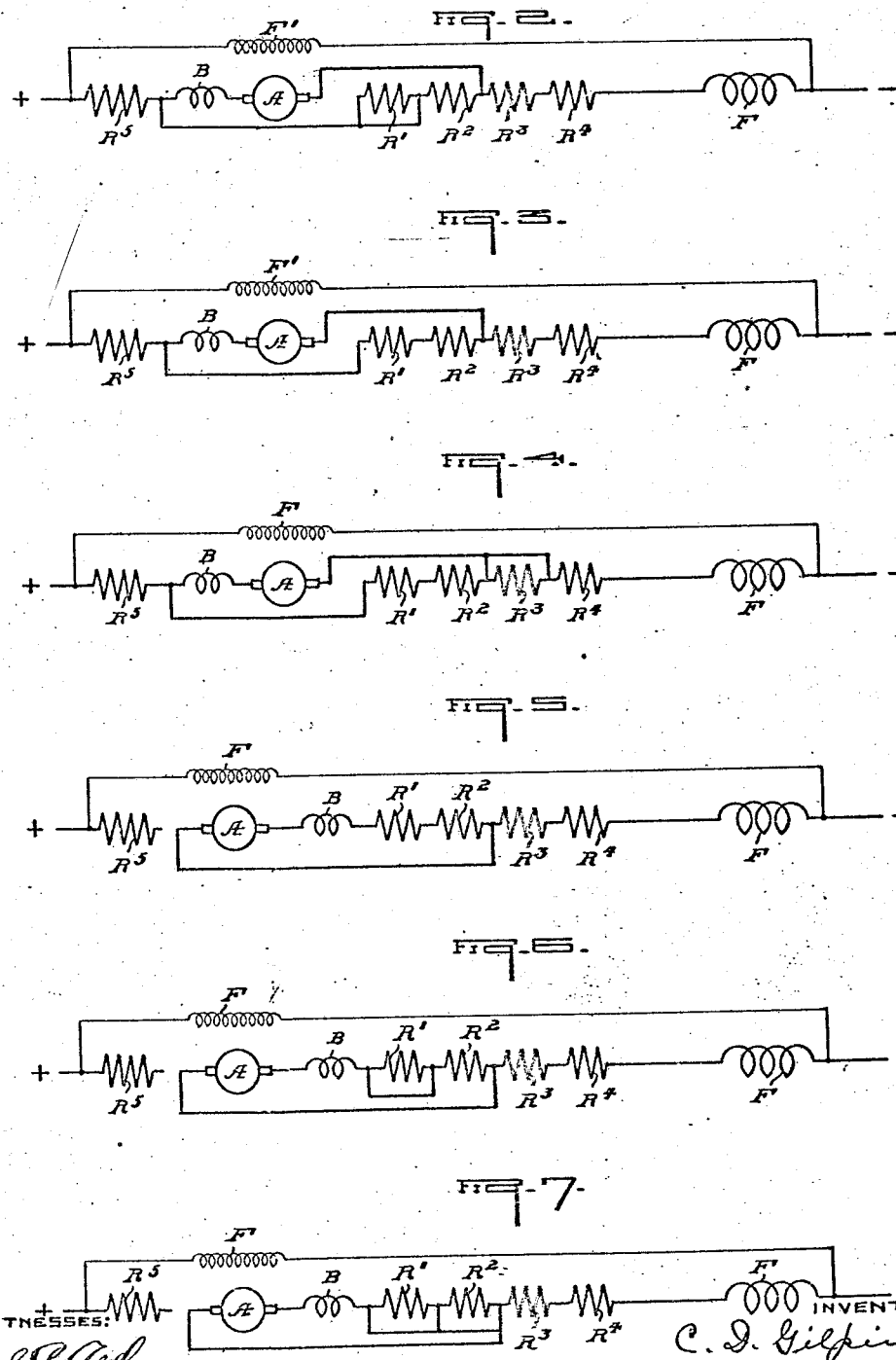

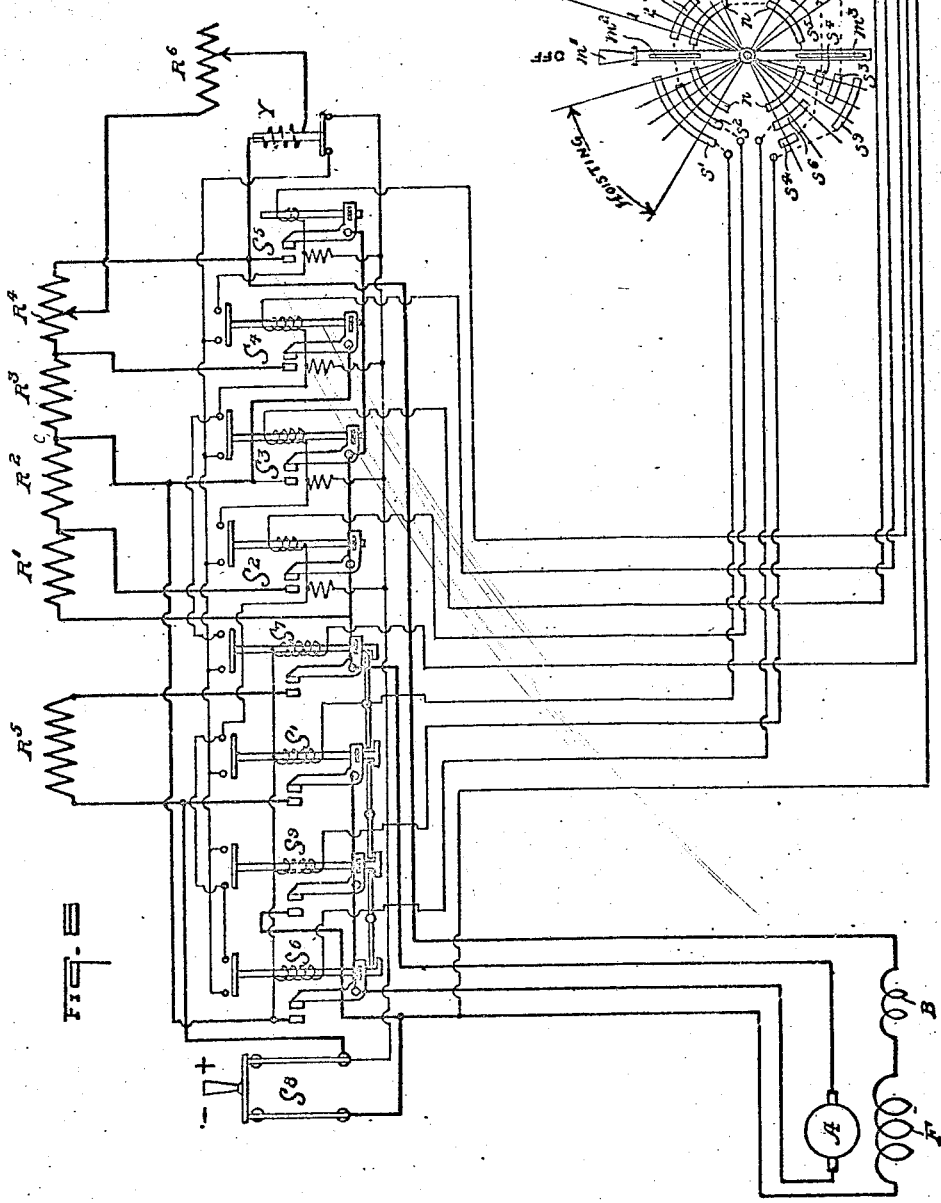

No. 895,400. PATENTED AUG. 4, 1908.
C. D. GILPIN.
MOTOR CONTROL SYSTEM.
APPLICATION FILED APR. 10, 1908.

4 SHEETS—SHEET 4.

WITNESSES:
INVENTOR
C. D. Gilpin
by F. N. Barber
ATTORNEY

UNITED STATES PATENT OFFICE.

CHARLES D. GILPIN, OF CLEVELAND, OHIO, ASSIGNOR TO THE ELECTRIC CONTROLLER AND SUPPLY COMPANY, OF CLEVELAND, OHIO, A CORPORATION OF OHIO.

MOTOR-CONTROL SYSTEM.

No. 895,400.        Specification of Letters Patent.        Patented Aug. 4, 1908.

Application filed April 10, 1908. Serial No. 426,233.

*To all whom it may concern:*

Be it known that I, CHARLES D. GILPIN, a citizen of the United States, residing at Cleveland, in the county of Cuyahoga and State of Ohio, have invented or discovered new and useful Improvements in Motor-Control Systems, of which the following is a specification.

My invention relates to systems of control for motors and has special reference to the control of motors used for hoisting though it may have other applications.

In the control of certain classes of hoisting work, such as that used in hoisting a bucket of ore or coal handling bridges, or the like, where the weight of the load hoisted will not quite, but almost, overhaul the motors and hoisting mechanism, I have found that it is not always desirable to provide a full reversing controller. In the control of large motors or motors at a distance, where the controller is made up of a series of magnetically-operated switches, I have devised a system of control which sustains a partial reverse controller, designed to overcome the objections of a full reversing controller. My partial reverse control system is simple and requires fewer magnetic switches than a full reverse controller when the same number of accelerating points are required in hoisting.

Referring to the drawings, Figure 1 is a diagrammatic view of my invention applied to a compound-wound motor. Figs. 2 to 7, inclusive, show diagrammatically a connection made when the master controller is on the lowering points 4, 5, and 6 and on the braking points 3, 2, and 1, respectively. Fig. 8 is a diagrammatic view of my invention applied to a series-wound motor. Figs. 9 to 14, inclusive, show diagrammatically with reference to Fig. 7 what Figs. 2 to 7 show with reference to Fig. 1.

Referring first to Figs. 1 to 7, A represents the motor; F, the series field; and F', the shunt field for the motor; and B the brake, preferably of the magnetically-retracted type. $S^8$ is the main switch for connecting the controller to the + and − mains.

The master-switch has the controller handle $m'$, which carries at opposite sides of its pivot the brushes or contacts $m^2$ and $m^3$, each arranged to bridge two or more stationary contact strips. The contact strips $s'$, $s^2$, $s^3$, $s^4$, $s^5$, and $s^6$ lead to the windings of the switches $S'$, $S^2$, $S^3$, $S^4$, $S^5$, and $S^6$, respectively.

If the handle $m'$ of the master-switch M is moved to the left so that it rests at the first hoisting position, the switch $S'$ will be closed, its actuating winding being in the following circuit: from the positive pole of the switch $S^8$, through the winding of the switch $S'$, the contact strips $s'$ of the master controller M, the brush $m^2$, and the negative contact $n$ to the negative pole of the switch $S^8$. The closing of the switch $S'$ closes the following motor circuit: from the positive side of the switch $S^8$, through the switch $S'$, the armature A, the brake B, the lower end of the switch $S^7$, and the resistance sections $R'$, $R^2$, $R^3$, and $R^4$, at the last of which the current divides, part going through the adjustable resistance $R^6$ and the winding of the throttle Y to the upper end of the switch $S^5$ where it meets the other branch of the current from the adjustable resistance section $R^4$. From the upper end of the switch $S^5$, the motor current passes through the field F to the negative side of the switch $S^8$. The motor will run with all the resistance except the section $R^5$ in circuit.

If the handle $m'$ be moved to the second position, the contact strip $s^2$ will be engaged by the brush $m^2$, whereby a circuit is closed from the positive side of the switch $S^8$ through the contacts of the throttle Y, the auxiliary contacts of the switch $S'$, the winding of the switch $S^2$, the contact strip $s^2$, the brush $m^2$ and the contact strip $n$ to the negative side of the switch $S^8$. The motor circuit is the same as for the first position except that the current shunts the section $R'$ of the resistance by passing through the switch $S^2$. Of course, the switch $S^2$ cannot close until the current passing through the throttle or relay Y falls so as to permit the contacts of the throttle to close. The circuit with the resistance $r$ holds the winding of the switch $S^2$ energized after the switch has closed even though the throttle Y should open, but is not of such strength to cause the switch to close, if open.

The movement of the handle $m'$ to the third hoisting position brings the brush $m^2$ on the strip $s^3$, which closes the circuit including the winding of the switch $S^3$, which will close as soon as the throttle Y will permit it to do so, the circuit including the resistance $r'$ holding it closed. As the handle $m'$ is moved to the fourth and fifth hoisting position, the strips $s^4$ and $s^5$ will be successively engaged by the brush $m^3$, whereby circuits including the windings of the switches $S^4$ and $S^5$ will be energized so as to cause the successive closing of these switches under the control of the throttle Y.

To stop the motor, the handle is brought to the "off" position, whereby the current supplying the motor will be interrupted by the opening of the automatic switches and the brake B will be deënergized, permitting the brake to set and hold the load. If the handle $m'$ be moved to the right from the "off" position to the first braking position, the brush $m^2$ connects the contacts $n$ and $s^3$ and the brush $m^3$ connects the contacts $n$, $s^5$, and $s^6$, which cause the energization of the winding of the switches $S^2$, $S^3$, and $S^4$ and the consequent closing of the said switches. No current can flow through the motor because the switch $S^7$ is still open, and consequently the brake B remains set. If now the handle $m'$ is moved to the second braking position, the brush $m^3$ passes off from the contact $s^5$, and the switch $S^3$ opens. When the handle $m'$ is moved to the third braking position, the brush $m^2$ passes from the contact $s^3$ and the switch $S^2$ opens.

If the handle $m'$ is now moved to the fourth position, which is the first lowering position, the contacts $s^2$ and $s^7$ are engaged by the brush $m^2$, whereupon the switches $S^2$ and $S^7$ will close, the switch $S^4$ remaining closed all the time. The motor circuit then exists as follows: from the positive pole of the switch $S^8$ through the resistance section $R'$, and the switch $S^7$, the brake B, the armature A, the switch $S^6$, and the point $e$, where it is joined by a branch circuit from the lower end of the switch $S^7$ through the switch $S^2$ and the resistance section $R^2$. From the point $e$ the motor circuit passes through the resistance sections $R^3$ and $R^4$, the upper end of the switch $S^5$, and the field F to the negative pole of the switch $S^8$. The passage of the current through this circuit releases the brake and drives the armature in a direction the reverse of its former direction. In this position the resistances $R^3$, $R^4$, and $R^5$ are in series with the motor and the resistance $R^2$ is in shunt with the armature, the resistance $R'$ being short-circuited by the switch $S^3$. Consequently, the load is lowered at a slow speed. The motor circuit for this first lowering position is shown on Fig. 2.

When the handle $m'$ is moved to the fifth position, being the second lowering position, the brush $m^2$ passes off from the contact $s^2$ thereby causing the switch $S^3$ to open. This is the only change in the electrical connections made at this position of the handle $m'$. By this opening of the switch $S^3$ the short-circuit for the resistance $R'$ is removed, causing the motor circuit to pass through the resistance $R'$ before passing to the resistance $R^2$. The motor circuit for this position is shown on Fig. 3, which is the same as Fig. 2 except that the resistance $R'$ is with the resistance $R^2$ in shunt with the armature.

If the controller handle $m'$ is moved to the sixth position, which is the third lowering position, the brush $m^3$ engages the contact strip $s^4$, causing the actuation of the switch $S^4$. This switch short-circuits the resistance $R^3$, the motor circuit otherwise remaining the same as in Fig. 3; the speed of the motor with the circuits as in Fig. 3 will obviously cause an increase of motor speed as compared with the condition of the circuits shown in Fig. 2; and the condition of the circuits in Fig. 4 will obviously cause an increase of motor speed from that caused by the condition of the circuits as shown on Fig. 3.

As the load approaches the desired position, the speed of the motor can be reduced by bringing the master switch handle $m'$ to the fifth position and then to the fourth position. The motor can then be retarded by bringing the handle $m'$ to the third position which is the first braking position. At this position of the handle the switch $S^6$ is closed and the switches $S^2$, $S^3$, $S^4$, $S^5$, and $S^7$ are opened. The path of the current through the motor to the brake is shown on Fig. 5. It is seen that the motor armature and the brake are removed from the power circuit and that the armature circuit is closed on itself through the brake and the resistance sections $R'$ and $R^2$. As the circuit through the shunt field $F'$ is not open the armature will generate current and dynamic braking will occur. To increase further the amount of this braking, the controller handle $m'$ is moved to the second braking position, whereupon the switch $S^2$ is closed and the resistance section $R'$ is shunted, the motor circuit connections being shown on Fig. 6. To increase further this braking effect, the handle $m'$ of the controller may be placed in the first position which closes the switch $S^3$ causing the armature circuit to be closed on itself through the brake, the circuit connections being shown on Fig. 7. To stop the downward motion of the hoist, the handle $m'$ of the master controller may be brought to off-position, which opens all the switches except switch $S^6$ and which also permits the brake B to be applied.

It is thus seen that by the use of only seven electro magnetic switches, I have secured five points of acceleration in the hoisting direction, three points in the lowering direction, and three points of retardation by dynamic braking. To secure the same number of points of acceleration with partial or full reversal and dynamic braking on the shunt field would require at least eight magnetic switches in many other control systems, with which I am familiar. I do not desire to limit myself to any definite number of switches, as it is evident that I can use only six switches and secure four points of acceleration in hoisting and two each in lowering and braking. No matter how many or few switches are used, I can secure the same number of acceleration points as in any other system by the use of one less switch.

Figure 12:
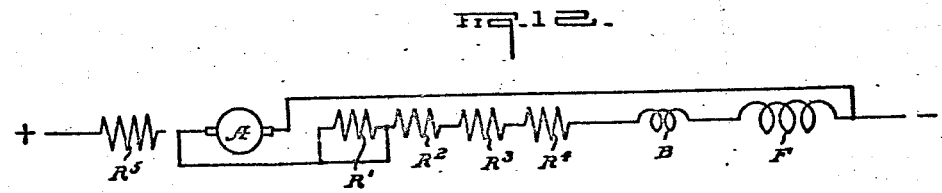
Figure 13:
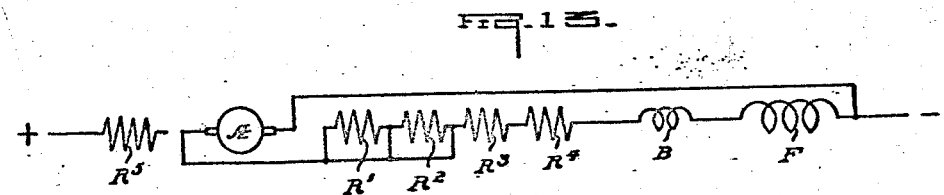
Figure 14:
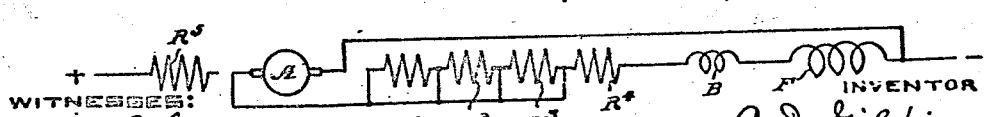

In Fig. 8 I have shown my control system applied to a series motor. It will be noted that one extra magnetic switch $S^9$ is required to accomplish the same results. This extra magnetic switch $S^8$ is placed between the switches $S'$ and $S^6$ and when closed connect the armature in a closed circuit which includes more or less of the resistance sections as shown in Figs. 12, 13, and 14. It will be observed that in all three of the braking positions that the motor circuit is interrupted at the switch $S^7$, the same as in the three braking positions shown in Figs. 5, 6, and 7.

To accomplish the same cycle of operation in any other type of controller system with which I am acquainted there will be required with the same number of accelerating points ten magnetic switches against eight in my system; that is, with my system in order to secure an equal number of acceleration points with a reversal and a graduated dynamic braking on a series motor, two less switches are required than with any other system with which I am familiar.

I claim—

1. In a motor-control system, a motor, a set of resistance sections, automatic acceleration switches for controlling said resistance sections, a switch to connect a source of current to one pole of the armature for rotating the same in one direction, and a pair of reversing switches, the members of one switch connecting the armature in a dynamic braking circuit and the members of the other switch connecting the source of current to the remaining pole of the armature.

2. In a motor-control system, a motor, a set of resistance sections, automatic acceleration switches for controlling said resistance sections, a switch to connect a source of current to one pole of the armature for rotating the same in one direction, and a pair of reversing switches, the members of one switch connecting the armature in a dynamic braking circuit including a portion of said resistance sections, and the members of the other switch connecting the source of current to the remaining pole of the armature.

3. In a motor-control system, a motor, a set of resistance sections, automatic acceleration switches for controlling said resistance sections, a switch to connect a source of current to one pole of the armature for rotating the same in one direction, and a pair of reversing switches, the members of one switch connecting the armature in a dynamic braking circuit and the members of the other switch connecting the source of current in the remaining pole of the armature at a point between the armature and the resistance sections.

4. In a motor-control system, a motor, a set of resistance sections, automatic acceleration switches for controlling said resistance sections, a switch to connect a source of current to one pole of the armature for rotating the same in one direction, a pair of reversing switches, the members of one switch connecting the armature in a dynamic braking circuit and the members of the other switch connecting the source of current to the remaining pole of the armature, and a master-switch for controlling said switches.

5. In a motor-control system, a motor, a set of resistance sections, automatic acceleration switches for controlling said resistance sections, a switch to connect a source of current to one pole of the armature for rotating the same in one direction, a pair of reversing switches arranged to connect the armature in shunt with a portion of the resistance sections and means for varying the number of resistance sections in one or both branches of said shunt.

6. In a motor-control system, a motor having a series-wound field, a set of resistance sections, automatic acceleration switches for controlling said resistance sections, a switch to connect a source of current to one pole of the armature to rotate the same in one direction, a pair of reversing switches, the members of one switch connecting the armature in a dynamic braking circuit and the members of the other switch connecting the source of current to the remaining pole of the armature, and a switch to connect the said field in the said braking circuit.

7. In a motor-control system, a motor having a series-wound field, a set of resistance sections, automatic acceleration switches for controlling said resistance sections, a switch to connect a source of current to one pole of the armature to rotate the same in one direction, a pair of reversing switches, the members of one switch connecting the armature in a dynamic braking circuit and the members of the other switch connecting the source of current to the remaining pole of the armature, a switch to connect the said field in the said braking circuit, and a master-switch for controlling the said switches.

8. In a motor-control system, a motor, a switch to connect a source of current to one pole of the armature for rotating the same in one direction, and a pair of reversing switches, the members of one switch connecting the armature in a dynamic braking circuit and the members of the other switch connecting the source of current to the remaining pole of the armature.

9. In a motor-control system, a set of resistance sections, acceleration switches for controlling said resistance sections, a switch to connect a source of current to one pole of the armature for rotating the same in one direction, and reversing switch mechanism to connect the source of current to the remaining pole of the armature at such a point as to include a portion of said resistance sections in series with the armature.

10. In a motor-control system, a set of resistance sections, acceleration switches for controlling said resistance sections, a switch to connect a source of current to one pole of the armature for rotating the same in one direction, reversing switch mechanism to connect the source of current to the remaining pole of the armature at such a point as to include a portion of said resistance sections in series with the armature, and means for varying the number of active resistance sections.

11. In a motor-control system, a set of resistance sections, acceleration switches for controlling said resistance sections, a switch to connect a source of current to one pole of the armature for rotating the same in one direction, and reversing switch mechanism to connect the source of current to the remaining pole of the armature at a point between the armature and the resistance sections.

Signed at Cleveland, Ohio, this 6 day of April, A. D. 1908.

C. D. GILPIN.

Witnesses:
C. PIRTLE,
H. M. DIEMER.